Jan. 20, 1931.  S. MUNSON  1,789,769

PNEUMATIC VEHICLE WHEEL

Filed Oct. 23, 1929

INVENTOR.
Sweney Munson,
BY
Geo. F. Kimmel
ATTORNEY.

Patented Jan. 20, 1931

1,789,769

UNITED STATES PATENT OFFICE

SWENEY MUNSON, OF PITTSBURG, KANSAS

PNEUMATIC VEHICLE WHEEL

Application filed October 23, 1929. Serial No. 401,840.

This invention relates to a vehicle wheel of the pneumatic type and has for its object to provide, in a manner as hereinafter set forth the tire therefor so formed as to prevent its sides from contacting with and being cut by the wheel rim when the tire is deflated.

A further object of the invention is to provide, in a manner as hereinafter set forth, a vehicle wheel having its tire so formed as to reduce possibility of the puncturing thereof to a minimum.

A further object of the invention is to provide, in a manner as hereinafter set forth, a vehicle wheel having an inflatable tire thereof of the pneumatic type, but with the tire set up without the employment of a removable inner tube, but when inflated to provide a cushioning action on the travel of the wheel.

A further object of the invention is to provide, in a manner as hereinafter set forth, a vehicle wheel having the tire thereof formed with a reinforcement to make the tire substantially puncture proof, as well as stiffening the same so that it will require less air pressure for inflation than the tires of a similar type now generally used and ride in an efficient cushioning manner, and further with the tire so constructed that if it should become deflated it can be used for traction purposes until a garage or other repair point for the tire is reached without injury to the side walls thereof.

A further object of the invention is to provide, in a manner as hereinafter set forth, a vehicle wheel having an inflatable tire reinforced in a manner to increase the life of the tread thereof and further with the wheel having elements for securing the tire against the sides of the rim of the wheel.

Further objects of the invention are to provide, in a manner as hereinafter set forth, a vehicle wheel of the pneumatic type which is simple in its construction and arrangement, strong, durable, compact, thoroughly efficient in its use, readily assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
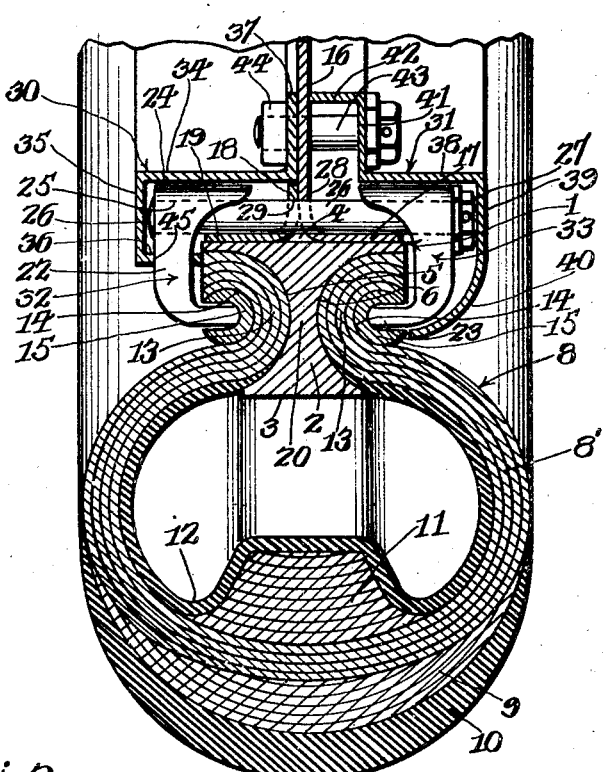
Figure 1 is a fragmentary view in cross section of a vehicle wheel of the pneumatic type in accordance with this invention.
Figure 2:
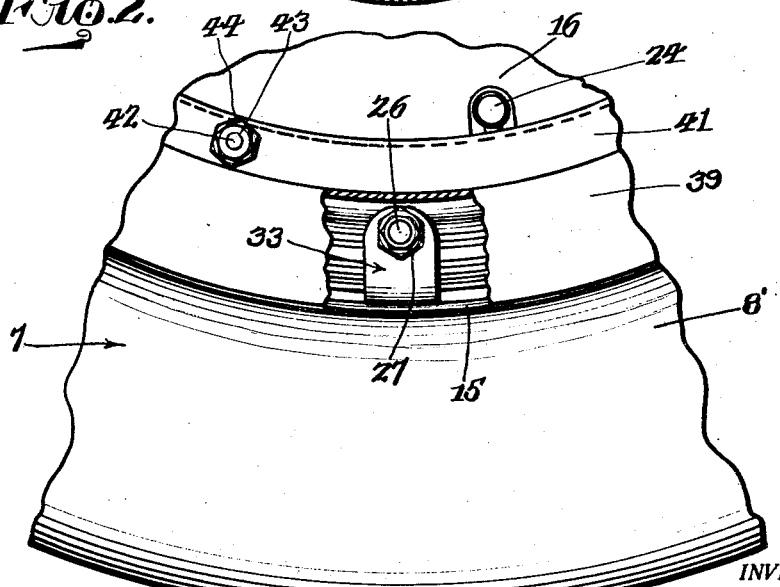
Figure 2 is a fragmentary view in side elevation and partly in section of a vehicle wheel of the pneumatic type in accordance with this invention.

The wheel includes an annular rim 1 which is of substantially T-shaped contour in cross section and in cross section the rim 1 gradually increases in width from its transverse median toward the outer and inner edges thereof. The body of the rim is indicated at 2, its outer edge at 3 and its rear edge at 4. In cross section the outer edge 3 of body 2 is of less length than the inner edge 4. Each side edge of the body 2 is formed with an annular groove of concaved cross section. The grooves are indicated at 5, 6. The inner edge 4 of rim 1, in cross section is of greater length than the cross sectional length of the felloe, against which the rim 1 is mounted. The felloe will be presently referred to. The walls of the grooves 5, 6 at their outer ends are positioned in close proximity to the outer and rear edges of body 2. The function of the grooves 5, 6 will be presently referred to.

The inflatable tire is referred to generally at 7 and it comprises a split, annular casing 8 formed from at least four plies or laminations 8' of rubberized fabric or other suitable material, a tread reinforcing 9, crescent shape in cross section, positioned against the outer face of the tread part of the outer ply 8' and formed of plies or laminations of rubberized fabric or other suitable material, a tread portion 10 of rubber positioned against the outer face of part 9 and of crescent shaped cross section, an annular enlargement 11 of frusto-conical cross section formed of plies or laminations of rubberized fabric or other suitable material and which is positioned against the inner face of the inner ply 8' centrally thereof and projects towards the rim 1, as well as being spaced therefrom and is further disposed in alignment with the central part of the tread portion 10, and a rubber lining 12 which is positioned against the major portion of the inner face of the inner ply 8' and encloses the enlargement 11. The lining 12 is substituted for the ordinary inflatable inner tube, and has its edges terminating a substantial distance inwardly of the split edges of the casing 8. The lining 12 is of the desired thickness and is impervious to air.

The parts, portions or elements of the tire are vulcanized together. The tread portion 10 terminates a substantial distance from the split ends of the casing 8.

The inner portion 13 of each side of the casing 8 is positioned within a groove 5 or 6 and the edges of said sides are flush with the side edges of the rim 1 at the inner portion of the latter. The portions 13 of the casing 8 snugly engage the walls of the grooves 5, 6 throughout and are bent over to form grooves 14 of semi-circular cross section and in which are arranged outwardly opening, oppositely disposed channeled retaining rings 15, which receive pairs of clamping elements to be presently referred to for the purpose of binding the portions 13 of the tire 7 to the rim 1 to couple the latter with the former.

The rim 1 is shown by way of example, as mounted on the felloe of a wheel body of the disc type. The wheel body includes a web 16 which is laterally flanged at its outer portion, as at 17, and attached to that side of the web, opposite the side from which projects the flange 17 is an annulus 18 of angle-shaped cross section having its horizontal part 19 aligning with the flange 17 to provide the felloe. The cross sectional length of the felloe is less than the cross sectional length of the rim. The tire is coupled with the rim, and the outer edge of the latter forms a continuation of the wall of the air chamber 20 with which communicates, through the rim 1 an air inlet valve 21. The chamber is provided by the casing 8.

A plurality of pairs of clamps are employed for securing the tire to the rim 1. The clamps of each pair are oppositely disposed. As each clamp is of like construction, but one will be described, as the description of one will apply to the other. Each clamp comprises a shank 22, a bill 23 integral with one end of the shank 22 and disposed at right angles to the latter, and a laterally disposed head 24 integral with the upper end of shank 22 and arranged in parallelism with respect to the bill 23.

The head 24 is of greater thickness than the bill 23 and is formed with a lengthwise disposed opening 25. The head 24 overlaps the felloe when the clamp is in active position.

The openings 25 of each pair of clamps align and extending therethrough is a clamping bolt 26 carrying a securing nut 27. The web 16 and annulus 18 are formed with aligning openings 28, 29 respectively, in proximity to the felloe for the passage of the bolt 26. The number of openings 28, 29 corresponds in number to the number of the pairs of clamps employed. The thickness of the shank 22 is greater than that of the bill 23 and the latter is of rectangular contour in cross section.

A pair of oppositely disposed, annular cover members 30, 31 are attached to the web 16. The member 30 encloses the upper portion of the clamps 32 of the pairs of clamps and the member 31 completely encloses the clamps 33 of the pairs of clamps and the nuts 27. The cover members 30, 31 are substantially channel-shaped and open inwardly. They also act as a protecting means for the clamping bolts.

The member 30 comprises a rear wall 34, an outer wall 35 and a forward wall 36. The wall 35 opposes the upper portions of the clamps 32. The wall 36 is provided with openings for the passage of the shanks of the clamps 32. The wall 34 abuts against the web 16 and is formed with a rearwardly extending flange 37, which also abuts the web 16. The wall 36 is of less length than the length of wall 34 and is positioned outwardly with respect to the felloe and extends to the rim 1.

The member 31 comprises a rear wall 38 and an outer wall 39 having an inwardly extending, curved forward portion 40 which projects beyond the forward end of the clamp 33. The wall 39 completely encloses the clamp 33 and nuts 27. The wall 38 at its inner end is provided with an angle-shaped flange 41 having its horizontal part 42 abutting the web 16.

Extending through the flanges 37, 41 and web 16 is a bolt 43 carrying a securing nut 44 and the latter in connection with bolt 43 clamps the flanges 37 and 41 against the web 16 whereby the cover members 30, 31 are detachably secured in position. The number of bolts 43 and nuts 44 can be as desired.

The openings formed in the wall 36 for the passage of the shanks 22 of the clamps 32 are indicated at 45. The walls 34 and 38 are arranged in close proximity to the head of the clamp.

The reinforcement of the casing 8 in the manner as set forth makes it practically puncture proof and also stiffens the tire so that it will require less air pressure than that employed in other tires and will still ride just as easy and also reduce to a minimum the dread of all motorists of having a tire puncture, but if it should puncture or deflate, they can ride until a point where repair can be reached without injury from rim cutting, because the enlargement 11 will carry the load on the rim to keep the walls of the casing from coming into contact with the latter, therefore it is thought the many advantages of a wheel of the pneumatic type in accordance with this invention can be readily understood, and although the preferred embodiment of the invention is as illustrated and described, yet it is to be understood that changes in the details of construction can be had which will fall within the scope of the invention as claimed.

What I claim is:

1. In a pneumatic wheel, a tire comprising an inflatable, split, annular casing formed of flexible laminations, an enlargement formed of flexible laminations projecting inwardly from and having its sides free of the inner lamination of said casing for positioning in circumferential, spaced relation with respect to the rim of the wheel, an impervious, flexible lining secured to the inner lamination of the casing and enclosing said enlargement, a tread reinforcement of crescent shaped cross section positioned against the tread part of the outer lamination of said casing, and a resilient tread of crescent shaped cross section enclosing said tread reinforcement.

2. In a pneumatic wheel, a tire comprising an inflatable, split, annular casing formed of flexible laminations, an enlargement formed of flexible laminations projecting inwardly from and having its sides free of the inner lamination of said casing for positioning in circumferential, spaced relation with respect to the rim of the wheel, an impervious, flexible lining secured to the inner lamination of the casing and enclosing said enlargement, a tread reinforcement of crescent shaped cross section positioned against the tread part of the outer lamination of said casing, and a resilient tread of crescent shaped cross section enclosing said tread reinforcement, said enlargement being frusto-conical in cross section.

3. In a pneumatic wheel, a tire comprising an inflatable, split, annular casing formed of flexible laminations, an enlargement formed of flexible laminations projecting inwardly from and having its sides free of the inner lamination of said casing for positioning in circumferential, spaced relation with respect to the rim of the wheel, an impervious, flexible lining secured to the inner lamination of the casing and enclosing said enlargement, a tread reinforcement of crescent shaped cross section positioned against the tread part of the outer lamination of said casing, and a resilient tread of crescent shaped cross section enclosing said tread reinforcement, said enlargement being frusto-conical in cross section, said lining terminating adjacent the split ends of the casing.

In testimony whereof, I affix my signature hereto.

SWENEY MUNSON.